Dec. 21, 1954  R. H. GRANT ET AL  2,697,814
TESTING APPARATUS
Filed April 11, 1952
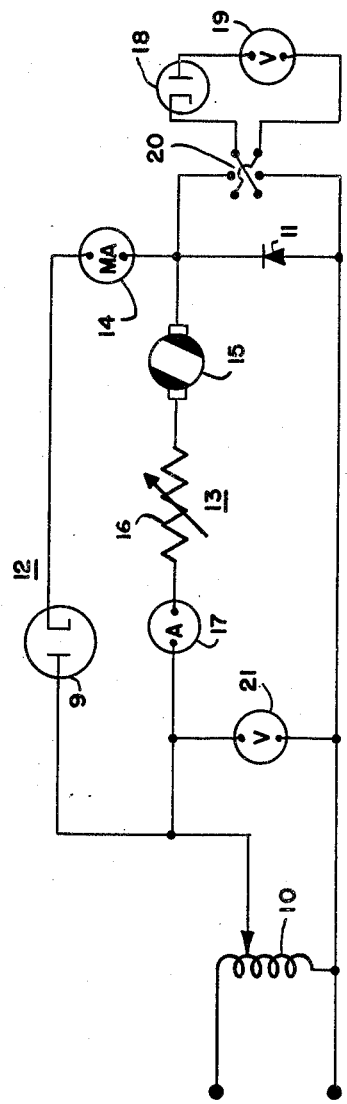
INVENTORS
RICHARD H. GRANT
CARL MARCUS
BY
George Sipkin
Lee D. Huntzberger, ATTYS

United States Patent Office 2,697,814
Patented Dec. 21, 1954

2,697,814

TESTING APPARATUS

Richard H. Grant, Brooklyn, and Carl Marcus, Bronx, N. Y.

Application April 11, 1952, Serial No. 281,881

9 Claims. (Cl. 324—158)

(Granted under Title 35, U. S. Code (1952), sec. 266)

The invention described herein may be manufactured and used by or for the Government of the United States of America for governmental purposes without the payment of any royalties thereon or therefor.

This invention relates to electric testing and more particularly to methods and apparatus for performing tests on dry disc rectifiers under simulated full load conditions.

Several methods are employed in the attempt to obtain the operating characteristics of dry disc rectifiers. These methods include the D. C. method, the A. C. method, and the cathode ray oscilloscope method.

In the D. C. method, selected D. C. voltage values are applied across the rectifier under test first in the low resistance direction and then in the blocking direction, the current values being recorded for each of the values of D. C. voltage applied. The disadvantages of the D. C. method are that full line voltage is not applied to the disc when measuring the forward or through current and the disc is not carrying load current when the full line voltage is applied in the back or reverse direction. Also, certain types of dry disc rectifiers are very unstable when rated D. C. voltage is applied in the reverse direction. Hence the resultant leakage current becomes a function of time as well as applied voltage.

In the A. C. method, two discs are used. To determine the resistance in the forward or low resistance direction, two parallel circuit branches are employed, each having a rectifier and an ammeter, the rectifiers being connected in opposite directions. The combination of said parallel branches are placed across a metered A. C. voltage source. In this arrangement, the forward or positive portions of the resulting alternating current passes through one rectifier branch and the reverse or negative portions of the alternating current passes through the other rectifier branch. To obtain the blocking resistance, the two rectifiers are connected in series, oppositely arranged so that each rectifier serves to block a portion of the alternating current. The two disc A. C. method does not have the disadvantage of the leakage current being a function of time but does have the other two disadvantages of the D. C. method, namely that full line voltage is not applied to the disc when measuring the forward or positive portion of the current and the disc is not carrying load current when the full line voltage is applied in the reverse or negative direction. A further disadvantage of the A. C. method is that it does not give the characteristics of a single disc but rather the average of two supposedly similar or identical discs. The two foregoing methods, inasmuch as they do not give the operating characteristics under operating conditions may be termed static methods.

The cathode ray oscilloscope method is employed in an attempt to obtain the disc characteristics under operating conditions and therefore may be called a dynamic method. However, to evaluate the pattern or trace which is obtained upon an oscilloscope is a tedious job and at best very inaccurate. This is particularly true when attempting to measure the leakage or reverse current where the applied line voltage is in the order of 50%, or less, of the rated voltage of the disc.

The present invention overcomes the above disadvantages, by providing a single setup for directly indicating the operating current and voltage values in the low impedance and high impedance directions respectively, and under operating conditions.

An object of this invention is to provide a simple accurate method for determining the operating characteristics of a dry disc type rectifier cell.

Another object of this invention is to provide a simple accurate method of determining the operating characteristics of a dry disc type rectifier cell under rated load conditions.

A further object of this invention is to provide a circuit arrangement that may be used in determining the operating characteristics of a circuit component under the forward and reverse half-wave portions, respectively, of an alternating voltage.

An additional object of this invention is to provide an apparatus for quickly testing the response of dry rectifiers under rated conditions.

Other objects and many of the attendant advantages of this invention will be readily appreciated as the same becomes better understood by reference to the following detailed description when considered in connection with the accompanying drawing wherein:

The single figure illustrates a circuit diagram of an apparatus for conducting a dynamic test on a dry disc rectifier.

The embodiment of the invention illustrated in the accompanying drawing includes a variable A. C. voltage source comprising an autotransformer 10. The dry disc rectifier 11 to be tested is connected to the voltage source by means including two branch circuits 12 and 13. One of the branch circuits, 12, includes a diode 9 and a milliammeter 14. This circuit permits current flow in a plate to cathode direction through the diode 9 and rectifier 11 but acts as an open circuit to current flow through the rectifier in the opposite direction. The diode 9 may be replaced by any other suitable rectifier means.

The other branch circuit 13 includes a synchronous switch 15, a variable resistor load 16 and an ammeter 17. The synchronous switch is a mechanical means for permitting the forward or positive half-cycle of the applied A. C. voltage to be applied across the rectifier 11. The synchronous switch 15 may likewise be replaced by any other suitable rectifier means. An important requirement of the synchronous switch 15 or other suitable rectifier means is that the component 15 be capable of carrying the load current while providing only a negligible voltage drop.

With the desired line voltage applied to the circuit, the synchronous switch 15 is adjusted to permit current flow through the rectifier in the forward or low resistance direction, said current passing through the synchronous switch 15, the load resistor 16, and ammeter 17. On this half of the voltage wave, current is prevented from flowing through the parallel circuit consisting of the diode 9 and milliammeter 14 by the action of diode 9, its plate being negative with respect to its cathode. On the reverse or negative half of the input voltage wave, synchronous switch 15 opens preventing any current from flowing through the ammeter 17 and load resistor 16. The plate of the diode 9 is now positive with respect to the cathode and permits current to flow through parallel branch 12. The magnitude of this current is determined by the applied voltage, and the resistance of the circuit which is the sum of the resistances of the rectifier 11, milliammeter 14, and diode 9. Inasmuch as the combined resistance of the milliammeter 14 and diode 9 is very low relative to the resistance of the rectifier 11 in this direction, the current read on the milliammeter 14 can be considered the true leakage current of the rectifier 11.

If it is desired to express the characteristics in terms of through or forward resistance and reverse, back, or leakage resistance, the voltage drop across the rectifier in each direction must be measured. The forward and reverse voltages across the rectifier 11 can be measured, by the use of a voltmeter 19, diode 18, and reversing switch 20. The voltmeter 19 and the diode 18 must of course be calibrated as a unit. The purpose of the diode 18, replaceable by any suitable rectifier, is to permit current to flow through the voltmeter in one direction only as selected by positioning the reversing switch 20 whereby the voltage across the rectifier due to either forward or reverse current flow may be selectively read.

It is to be noted that the rectifier under test is carrying high load current with a low voltage drop on the positive portion of a voltage cycle and small leakage current with a high voltage drop on the negative portion of a voltage cycle in the identical manner that it functions under actual service conditions.

The particular type of instruments used will depend upon the purpose for which the data are to be used. The ammeter 17, milliammeter 14, and voltmeter 19 can be of the D. C. type indicating average values, the A. C. type namely dynamometer or thermocouple indicating R. M. S. values, or specially constructed instruments indicating peak values.

Other suitable arrangements and methods for alternately placing the milliammeter in series with the rectifier when current is flowing in the high impedance direction, and the variable load and ammeter in series with the rectifier when current is flowing in the low impedance direction lie within the purview of this invention.

Obviously many modifications and variations of the present invention are possible in the light of the above teachings. It is therefore to be understood that within the scope of the appended claims the invention may be practiced otherwise than as specifically described.

We claim:

1. A method for determining the dynamic resistance characteristics of a dry rectifier or the like comprising quantitatively metering separately and simultaneously the current flow in each direction through said rectifier resulting from an alternating applied voltage.

2. Apparatus for determining the dynamic resistance characteristics of a dry rectifier and the like, comprising a source of continuous non-varying alternating voltage, means adapted for connecting said source across the rectifier, said means including alternately conductive circuit branches connected in circuit with the rectifier for independently and substantially simultaneously quantitatively metering the flow of current through the rectifier in the forward and backward directions, respectively.

3. Apparatus as in claim 2 wherein one of said branches comprises a switch means in series with a resistor load operable on positive pulses of said variable alternating voltage to pass current through the rectifier in the low resistance direction thereof, and said other branch comprises a diode and an ammeter connected in shunt across said one branch and adapted to be effectively open-circuited during the period of application of the positive voltage pulses.

4. Apparatus as in claim 2 further comprising unidirectional voltmeter means for metering the voltage drop across the rectifier due to the application of the positive and negative pulses, respectively, of alternating voltage.

5. Apparatus for determining the dynamic resistance characteristics of a dry rectifier or the like comprising first circuit means adapted for connection in circuit with the rectifier and operable to permit application of positive pulses only of alternating voltage to the rectifier and for metering the resultant rectifier current under various load conditions, and second circuit means adapted for connection in circuit with the rectifier and operable to permit application of negative pulses only of alternating voltage to the rectifier and for metering the rectifier current due to the negative pulses only of alternating voltage, and unidirectional voltmeter means adapted for connection across the rectifier for metering the voltage across the rectifier due to positive and negative current flow, respectively.

6. Apparatus for determining the dynamic electrical characteristics of a half-wave dry disc rectifier or the like comprising a variable alternating power supply, a variable load in series with said power supply, an ammeter in series with said variable load and power supply and adapted for indicating the rectifier load current, switching means adapted for connecting in series and disconnecting said series-connected power supply, load, and ammeter from the rectifier for permitting only the positive pulses of the alternating power supply to be applied to the rectifier through the ammeter and load combination whereby only the current due to the positive pulses of the alternating power supply passes through said ammeter; a parallel bypass connected across said switching means, load, and ammeter, comprising a diode and a sensitive ammeter whereby the positive pulses of the alternating power supply is adapted to cause forward rectifier current to flow through the ammeter, load, and switching means and the negative pulses of the alternating power supply is adapted to cause back rectifier current to flow through the diode, and the sensitive ammeter, a second voltmeter and a second diode in series, a reversing switch adapted for connecting the second voltmeter and diode directly across the rectifier to indicate the voltage across the rectifier for current flowing through the rectifier due to the positive and negative pulses, respectively, of the applied alternating voltage.

7. A method for determining the dynamic resistance characteristics of a dry rectifier or the like comprising the steps of; applying a continuous, non-varying alternating voltage across the rectifier; quantitatively metering concurrently forward current flow through the rectifier resulting from alternate half-cycles at one polarity of the applied alternating voltage, and back current flow through the rectifier resulting from the alternate half-cycles at the reverse polarity of the applied alternating voltage; and quantitatively metering the voltage drops across the rectifier due to current flow therethrough in the forward direction and in the reverse direction respectively; each of said current and voltage metering steps providing values that correspond mathematically relative to the current and voltage waveforms.

8. A method for determining the dynamic resistance characteristics of a dry rectifier or the like comprising the steps of; applying across the rectifier a continuous, non-varying alternating voltage approximating operating conditions of the rectifier; quantitatively metering concurrently forward current flow through the rectifier resulting from alternate half-cycles at one polarity of the applied alternating voltage, and back current flow through the rectifier resulting from the alternate half-cycles at the reverse polarity of the applied alternating voltage; and quantitatively metering the voltage drops across the rectifier due to current flow therethrough in the forward direction and in the reverse direction respectively.

9. A method for determining the dynamic resistance characteristics of a dry rectifier or the like comprising the steps of applying a continuous, non-varying alternating voltage across the rectifier; quantitatively metering forward current flow through the rectifier resulting from alternate half-cycles at one polarity of the applied alternating voltage; quantitatively metering the alternate half-cycles of the alternating voltage producing the forward current flow; quantitatively metering the back current flow through the rectifier resulting from the alternate half-cycles at the reverse polarity of the applied alternating voltage; and quantitatively metering the alternate half-cycles of the alternating voltage producing the back current flow, all of said metering steps being carried out substantially concurrently whereby the electrical conditions during metering are substantially constant.

References Cited in the file of this patent

UNITED STATES PATENTS

| Number | Name | Date |
|---|---|---|
| 2,459,849 | Stateman | Jan. 25, 1949 |

OTHER REFERENCES

"Testing Selenium Rectifier Cells" by W. E. Schwanhausser. General Electric Review, November 1944, pp. 53, 54, 55.